United States Patent [19]

Kasiewicz

[11] 4,280,087
[45] Jul. 21, 1981

[54] VOLTAGE REGULATOR

[76] Inventor: Stanley J. Kasiewicz, Southfield, Mich.

[21] Appl. No.: 76,882

[22] Filed: Sep. 19, 1979

Related U.S. Application Data

[63] Continuation of Ser. No. 855,105, Nov. 25, 1977, abandoned.

[51] Int. Cl.³ ............................................... H02J 7/14
[52] U.S. Cl. ...................................... 322/28; 320/64; 322/99
[58] Field of Search ..................... 322/28, 60, 72, 99; 320/61, 64, 68

[56] References Cited

U.S. PATENT DOCUMENTS

| | | |
|---|---|---|
| 3,529,211 | 9/1970 | Brayley . |
| 3,539,864 | 11/1970 | Harland, Jr. et al. .............. 322/60 X |
| 3,668,504 | 6/1972 | Kawashima ........................ 322/28 X |
| 3,852,653 | 12/1974 | Kuroda et al. . |
| 3,855,517 | 12/1974 | Allport . |
| 3,866,106 | 2/1975 | Taguchi et al. ..................... 322/28 X |
| 3,942,097 | 3/1976 | Itoh et al. ............................... 322/28 |
| 3,943,408 | 3/1976 | Jakobs et al. . |

Primary Examiner—Robert J. Hickey
Attorney, Agent, or Firm—Reising, Ethington, Barnard, Perry & Brooks

[57] ABSTRACT

A voltage regulator for controlling the charging of a battery by the regulation of the output voltage of a generator. In normal operation, the voltage regulator senses the output voltage of the battery through a first sensing line, and enables or disables the energization of the generator field winding if the battery voltage is respectively below or above a desired regulated value. In the event of an interruption in the electrical connection between the battery and generator, a second sensing line, comprising a resistance, senses the generator output voltage and causes the voltage regulator to become operative to regulate the generator voltage at a predetermined upper voltage limit.

4 Claims, 1 Drawing Figure

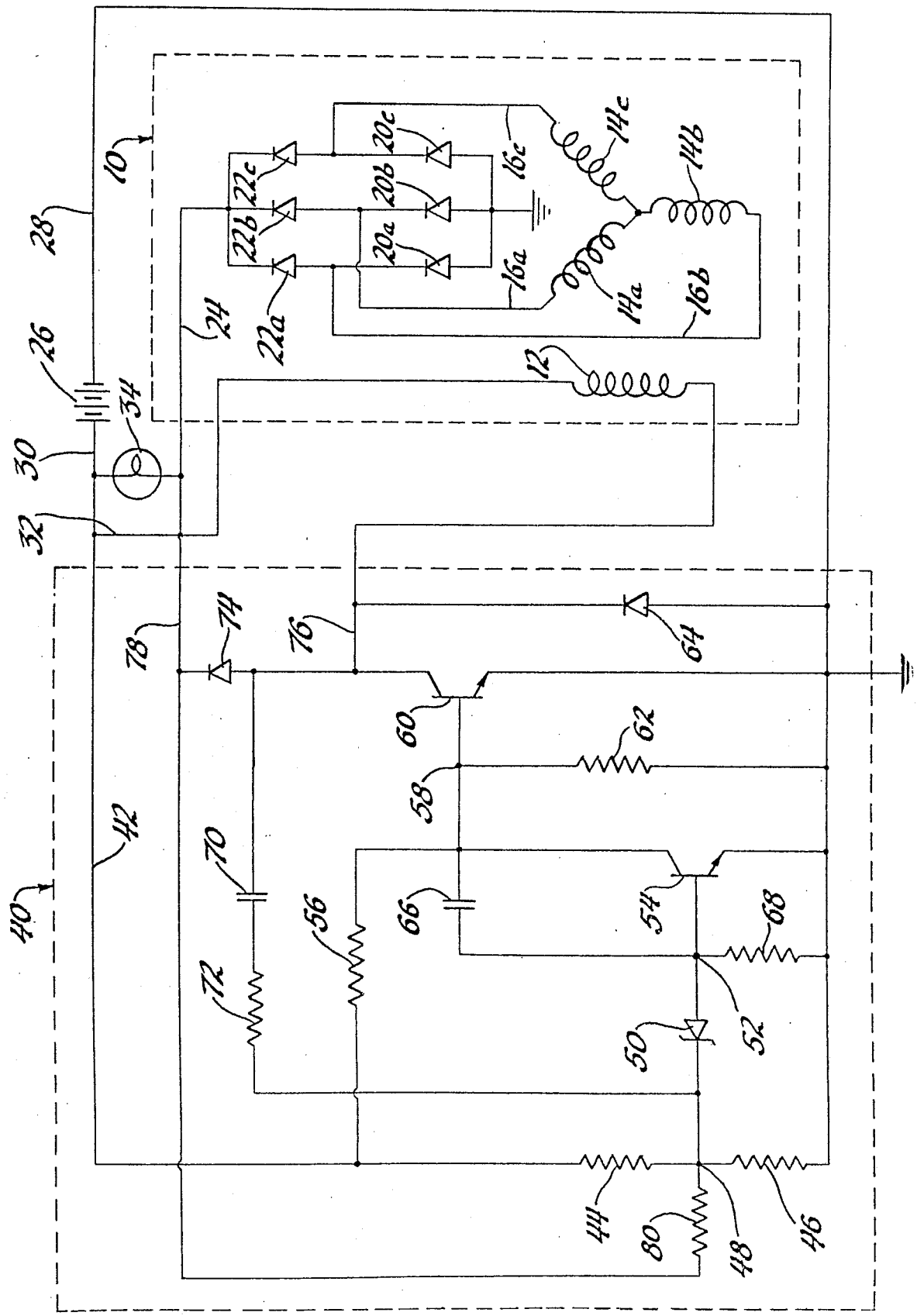

VOLTAGE REGULATOR

This is a continuation of application Ser. No. 855,105, filed Nov. 25, 1977.

BACKGROUND OF THE INVENTION

1. Field of the Invention

The present invention relates to voltage regulators, and, more particularly, it relates to a voltage regulator which functions under normal operating conditions to control the charging of a battery by the regulation of the output voltage of a generator, and functions under a fault condition to regulate the output of a generator at a predetermined upper voltage limit.

2. Description of the Prior Art

Voltage regulators are used to control the charging or energization of a battery by the regulation of the output voltage of a generator. A common environment for a voltage regulator is in an automotive electrical system, where an automobile battery, which is nominally rated at 12 volts, is energized by a generator driven by the vehicle engine, which may assume a broad range of rotational speeds. The specific function of the voltage regulator is to maintain the battery voltage at a desired regulated level by the regulation of the generator output voltage, notwithstanding the rotational speed of the engine and the amount of load on the battery.

More specifically, the conventional generator includes a rotor having formed on it a field winding. The field winding is magnetically coupled to stator windings. The rotating magnetic field associated with the field winding induces AC voltages at the output terminals of the stator windings. These AC voltages are rectified into DC form and supplied to the battery through the cable interconnecting the generator and the battery. The regulation of the generator output most commonly takes place through the control of the energization of the field winding. The generator output is directly related to the current in the field winding, and by increasing or decreasing the field current, the generator output voltage may be increased or decreased accordingly.

It may occur that a fault or malfunction will interrupt the electrical connection between the generator output terminal and the battery, i.e. the battery cable between the generator output stud and the battery terminal may become defective and fail to pass current. In this instance, the battery will begin to discharge and relay to the voltage regulator a signal condition indicating that the battery needs charging. Accordingly, the voltage regulator will energize the generator field winding and increase the generator output voltage in an attempt to bring the battery up to the desired regulated voltage level. However, the interruption in the electrical connection between the generator and battery will prevent the battery from receiving the generator output voltage. The low battery signal condition that is supplied as input to the voltage regulator will persist, and tend to cause the generator to run away until it encounters a physical limitation on its output voltage level.

The voltage regulator should therefore be properly equipped with means for sensing the occurrence of an interruption between the output terminals of the voltage and the battery, and responding to the interruption by the regulation of the generator output voltage at an acceptable upper limit.

The prior art has addressed both the problems of voltage regulation under normal operating conditions, and voltage regulation under a fault condition. The patent to Harland, Jr. et al, U.S. Pat. No. 3,469,168 is exemplary of a voltage regulator circuit meeting these functional requirements. Specifically Harland, Jr. et al teaches a voltage regulator circuit for controlling the output voltage of a generator under normal operating conditions, and moreover for controlling the generator output voltage under a fault or malfunction condition.

However, the Harland, Jr. et al voltage regulator circuit is designed with a degree of complexity above the voltage regulator of the present invention. Design complexity is an important factor affecting product cost and reliability. When one contemplates the scale of production required to equip each automobile being manufactured with a voltage regulator circuit, it can be appreciated that design simplification represents a significant achievement in product reliability and cost reduction.

The specific point of complexity of the Harland, Jr. et al reference is the use of a Zener diode for the sensing element that senses the generator output voltage having reached a predetermined, upper limit. An objective of the present invention is to realize a simplification and improvement in the design of a voltage regulator circuit by replacement of the Zener diode with a less costly, more reliable sensing element.

SUMMARY OF THE INVENTION

The present invention is a voltage regulator adapted to control the energization of an electrical storage device by the regulation of the output voltage of a generator, and moreover, to regulate the output voltage of the generator at an acceptable voltage level in the event of a fault or malfunction in the electrical interconnection of the battery and generator.

The present invention contemplates the use of a generator having a field winding and magnetically coupled stator windings. By controlling the energization of the field winding, the induced voltages at the output terminals of the stator windings are correspondingly controlled. The voltages appearing on the output terminals on the stator windings are then rectified and supplied to the battery through an electrical connector.

The voltage regulator of the present invention includes a first signal path that senses the terminal voltage of the battery and provides a signal to the balance of the circuit indicating the need to energize or deenergize the generator field winding depending on whether the battery terminal voltage is below or above a desired regulated level, respectively. The balance of the circuitry includes a control network that interprets the signal on the first signal path and enables or disables the energization of the generator field winding as appropriate.

The subject voltage regulator further includes a second signal path that senses the voltage at the generator output terminal, and conditions the control network to regulate the generator output voltage at an acceptable upper limit in the event of a fault or malfunction in the electrical connection between the generator output terminal and the battery terminal. More specifically, the second signal path comprises a resistance communicating the generator output terminal to the control circuit portion of the voltage regulator. The resistance is calculated to have an ohmic value of sufficient magnitude to allow a signal to be developed to condition the control circuit to regulate the generator output voltage at the upper, acceptable limit when the fault or malfunction occurs. The use of a resistance as a signal developing component represents a simplification in design and improvement in reliability over previous voltage regulator designs.

Other advantages of the present invention will be readily appreciated as the same becomes better understood by reference to the following detailed description when considered in connection with the accompanying drawing.

BRIEF DESCRIPTION OF THE DRAWING

The drawing FIGURE is a schematic representation of a voltage regulator incorporating the present invention functionally connected to a generator and battery.

DETAILED DESCRIPTION OF A SPECIFIC EMBODIMENT

With reference to the drawing, the FIGURE broadly illustrates a voltage regulator circuit incorporating the present invention along with a generator in an electrical storage battery. A common example of the system represented by FIG. 1 is an automotive electrical system where a generator 10 is driven by the automobile engine. The energizing voltage output by the generator 10 is supplied to a battery 26 which drives the electrical loads in the system. A voltage regulator circuit 40 is intercoupled between the generator 10 and battery 26 and has as its function the regulation of the battery voltage by the control of the energization of the battery by the generator.

More specifically, the generator may be of conventional design and comprise a field winding 12 that is magnetically coupled to a Y-type interconnection of stator windings 14a, b and c. The amount of current in the field winding 12 will determine the magnitude of the AC output signal on each of the stator windings 14a, b and c.

The generator 10 further comprises a rectifier bridge 18 whose purpose is to rectify the AC voltages on the stator output terminals 16a, b and c into DC form. The rectifier bridge 18 comprises a first group of reverse diodes 20a, b and c having their anodes connected to respective stator output terminals 16a, b and c, and having their cathodes tied together in common and biased to ground. The reverse diodes 20a, b and c are effective to shunt to ground any voltages of a negative polarity appearing on the output terminals 16a, b and c.

The rectifier bridge 18 further comprises a group of forward diodes 22a, b and c whose purpose is to transmit through to a generator output terminal 24 any positive voltages appearing on the stator output terminals 16a, b and c. The forward diodes 22a, b and c have their cathodes connected respectively to the stator output terminals 16a, b and c, and their anodes tied together in common and joined to the generator output terminal 24.

The electrical storage battery 26 may similarly be of a conventional design, with a nominal 12 volt rating. The battery 26 has a negative terminal 28 tied to the system ground. A positive terminal 30 is interconnected to the generator output terminal 24 through a connector 32, which, in common parlance, is the battery cable.

An indicator lamp 34 is connected across the positive terminal of the battery 30 and the generator output terminal 24. The indicator lamp 34 is usually present on the automobile instrument panel and is provided to warn the operator of a malfunction in the electrical system. The operation of the indicator lamp 34 will hereinafter be discussed in greater detail.

The voltage regulator circuit 40 has as its function the regulation of the energization of the battery 26 by the generator 10. The voltage regulator 40 of the present invention has the more specific purposes of, first, regulating the voltage level appearing at the positive terminal 30 of the battery 26 under normal operation; and, second, governing the generator 10 to maintain its output voltage signal at a predetermined, upper limit in the event of a fault or malfunction in the electrical interconnection between the generator and the battery. The manner in which the voltage regulator circuit 40 accomplishes these specified tasks will next be discussed in order.

The voltage level appearing at the positive terminal 30 of the battery 26 is communicated to the voltage regulator circuit 40 by a battery sense line 42. The battery sense line 42 supplies the battery voltage to a voltage divider network defined by the serial connection of a pair of resistors 44 and 46. The voltage signal at the node 48 common to resistors 44 and 46 is supplied to the anode of a Zener diode 50. The ohmic values of the voltage divider network and the threshold level of the Zener diode 50 are selected to cause the Zener diode to break down if the voltage appearing at the positive terminal 30 of the battery 26 is above the desired regulated value, and to not break down if the voltage level at the positive battery terminal is below the desired regulated value.

Assuming the condition of breakdown of the Zener diode 50, the base of a transistor 54 will be energized through the voltage signal appearing at the node 48 of the voltage divider network. In addition, a resistor 56 tapping off the battery sense line 42 energizes the collector of the transistor 54 causing it to saturate and become conductive.

A second transistor 60 is interconnected with the first transistor 54 and is responsive to a change in state of the first transistor 54 to make a corresponding, but opposite, change in state. More specifically, the base of the second transistor 60 is biased high at node 58 by a voltage divider network defined by the serially connection of resistors 56 and 62 when the first transistor 54 is in cutoff; this condition causes the second transistor 60 to be in saturation and conducting. However, the saturation of the first transistor 54 causes the voltage at node 58 to drop and correspondingly cause the second transistor 60 to go into cutoff. In short, there is a mutually opposite relation between the states of the first and second transistors 54 and 60.

Assuming again the condition where the first transistor 54 is in saturation, the voltage at node 58 will be low and the second transistor 60 will be in cutoff and nonconductive. Accordingly, there will be corresponding drop in current through the line 76 connecting the field winding 12 with the collector of the transistor 60. The drop in field current is reflected as a decrease in the energization voltage appearing on the generator output terminal 24.

Next, the alternative condition where the voltage at the positive terminal 30 of the battery 26 is below the desired level is assumed. In this condition, the voltage level appearing at the node 48 will be insufficient to cause breakdown of the Zener diode 50. Accordingly, the voltage level at node 52 will be correspondingly low, forcing the first transistor 54 into cutoff. The cutoff condition of the transistor 54 brings up the voltage level at node 58 and forces the second transistor 60 into saturation. The conductive state of the second transistor 60 then allows current to flow through line 76 to energize the field winding 12. The energization of the field winding 12 causes a responsive increase in the energization signal appearing on the generator output terminal 24.

It can be seen from the foregoing, that the voltage regulator circuit 40 controls the level of the voltage appearing at the positive terminal 30 of the battery 26 through an iterative process, i.e. switching on and off the energization of the field winding 12 and the generator 10. In the actual environment of an automobile, this switching action may occur up to 100 cycles per second to maintain the desired generator output.

The voltage regulator circuit 40 includes a feedback switching network to facilitate the switching of the Zener diode 50 upon the occurrence of a transition in the voltage level at node 48 above or below the diode breakdown level. The feedback switching network is defined by the serial connection of a capacitor 70 and resistor 72. A transition in the state of the Zener diode 50 will be propagated through the circuit to the collector of the second transistor 60. The transition in state of the second transistor 60 from cutoff to saturation or vice versa will cause the capacitor 70 to discharge or charge, respectively, and feeback a signal pulse to the node 48 that stabilizes the switching operation.

To protect the second transistor 60 against sudden negative transient voltages from the battery 26 caused by the switching on and off of electrical loads, a diode 64 is connected in parallel relation across the collector and emitter terminals of the transistor. Specifically, the diode 64 has its anode connected to the collector, and its diode connected to the emitter, and is responsive to reverse polarization of the transistor 60 to shunt to ground any current caused by spurious reverse voltages.

A second diode 74 acts in conjunction with the first diode 64 to complete the current path from the battery 26 to the first diode, and also to provide a discharge path for reverse voltages caused by transitions in the energization of the field winding 12. Specifically, the second diode 74 is connected in parallel relation with the field winding 12 and in serial relation with the first diode 64. The anode of the second diode 74 is connected to the generator output terminal 24, and the cathode is connected to the collector of the second transistor 60, consistent with the polarity of the first diode 64.

The voltage regulator 40 also includes a capacitive filter to shunt any transient battery voltage away from the Zener diode 50, that may otherwise cause a spurious transition in the diode state. More specifically, a filtering capacitor 66 is connected in serial relation with the resistor 56 and another resistor 68 connected between the base of the first transistor 54 and ground. When, in the first complementary circuit condition where the transistor 54 is in saturation, a transient battery pulse appears at the node common to the resistor 56 and capacitor 66, it is shunted to ground through the low impedance base-emitter path of the transistor 54. Alternatively, when the second complementary circuit condition exists and the transistor 60 is saturated, a transient voltage pulse appearing at the node common to resistor 56 and capacitor 66 will be shunted to ground through the low impedance base-emitter path of the transistor 60.

The second condition with which the voltage regulator circuit 40 of the present invention is concerned is the occurrence of a fault or malfunction in the electrical interconnection between the generator output terminal 24 and the positive terminal 30 of the battery 26. Stated otherwise, a fault in connector 32 would cause the generator 10 to keep increasing its energization signal without limit until a catastrophic failure occurs in the charging system.

Assuming the condition where the generator output terminal 24 and the positive battery terminal 30 are electrically isolated from one another, there would be no charging of the battery 26 by the generator 10. The battery 26 would begin to discharge and soon approach a voltage level that is insufficient to cause breakdown of the Zener diode 50. As will be recalled in the preceding discussion of this condition, the first transistor 54 would be forced into cutoff, and the second transistor 60 would be forced into saturation. The saturation of the second transistor 60 will allow current to flow through line 76 to energize the field winding 12. The energization of the field winding 12 will cause the generator 10 to increase the magnitude of the energizing voltage appearing on the generator output terminal 24. However, the battery 26 is no longer responsive to an increase in the energization signal on generator output terminal 24, and the voltage regulator circuit 40 cannot normally sense an increase in battery voltage and switch into an opposite state where the energization of the field winding 12 is cut off. The inability of the voltage regulator circuit 40 to disable the energization of the field winding 12 will cause the generator 10 to approach a runaway state, i.e. the energization voltage on generator output terminal 24 will increase until it is bounded by a physical limitation of the generator 10.

The voltage regulator circuit 40 of the present invention addresses this limitation by providing a second, sensing line to detect the presence of an energization voltage in excess of a predetermined, upper limit, and responds by disabling the energization of the field winding 12. More specifically, the voltage regulator circuit 40 includes a second, generator sense line 78 that senses the voltage level at the generator output terminal 24. This voltage is applied across a bilateral, linear resistor 80 which is connected to resistor 46 to define a voltage divider network. The resistor 80 is selected to have a sufficiently high ohmic value so that it will not interfere with the normal regulation of the generator 10. However, when a fault condition exists that allows the voltage level appearing at the generator output terminal 24 to reach the upper, predetermined limit, the signal developed across the resistor 80 will cause the voltage at node 48 to become sufficiently high to cause breakdown of the Zener diode 50. As was previously discussed, the breakdown condition corresponds to a disabling of the energization of the field winding 12. In effect, the provision of the second sensing line 78 through the resistor 80 provides a failsafe mechanism for regulating the generator at a higher, but limited, voltage level. In practice, this higher regulated value may be 25 to 30 volts.

The indicator lamp 34 is effective to alarm the operator of the presence of a fault or malfunction condition. The indicator lamp 34 is connected between the positive terminal 30, the battery 26 and the generator output terminal 24. In the fault condition, there is an electrical potential difference between the terminals 24 and 30 of sufficient magnitude to cause the indicator lamp to turn on.

The invention has been described in an illustrative manner, and it is to be understood that the terminology which has been used is intended to be in the nature of words of description rather than of limitation. The preceding description is but of a specific embodiment, and the invention is intended to be limited only by the appended claims.

The embodiments of the invention in which an exclusive property or privilege is claimed are defined as follows:

1. A voltage regulator circuit for use in the regulation of the energization of an electrical storage device by a generator, the generator being of the type having a field winding and at least one output winding, the output winding being responsive to energization of the field winding to provide an energizing voltage on a generator output terminal, the electrical storage device being of the type having an output terminal for receiving an energizing voltage interconnected to the generator output terminal, the voltage regulator circuit comprising:

control means, coupled to the generator field winding, and responsive to a control signal of a first level for enabling the energization of the field winding, and responsive to a control signal of a second level for disabling the energization of the field winding;

first and second resistors connected in a series circuit across the terminals of the electrical storage device, the junction of the first and second resistors being connected to the control means for providing a control signal of the first level when the energization of the electrical storage device is below a first predetermined threshold and of the second level when the energization exceeds the first predetermined threshold; and a third resistor connected in a series circuit with said second resistor across the terminals of the generator, all of said resistors being bilateral resistors and both of said series circuits being bilaterally conductive, said first resistor and said third resistor being in parallel circuit relation to each other and having ohmic values for providing, upon the occurrence of a fault in the interconnection between output terminals of the generator and electrical storage device, a control signal of the first level when the energizing voltage on the generator output terminal is below a second, predetermined threshold, and of the second signal level when the energizing voltage exceeds the second predetermined threshold and a fault indicator connected directly between the output terminal of the generator and the output terminal of the storage device and being energized upon said occurrence of said fault.

2. The voltage regulator circuit as defined in claim 1 wherein the control means includes:

a Zener diode coupled to said junction and responsive to a control signal of the first level to enter diode breakdown, and responsive to a control signal of the second level to enter diode cutoff;

a first switching transistor, coupled to the Zener diode means and responsive to a diode breakdown condition to enter saturation, and responsive to a diode cutoff condition to enter cutoff;

a second switching transistor, coupled to the first switching transistor and responsive to a saturation condition of the first transistor to enter cutoff, and responsive to a cutoff condition of the first transistor to enter saturation, the second switching transistor further forming a part of a current path with the field winding, and being effective to enable the energization of the field winding when in saturation, and effective to disable the energization of the field winding when in cutoff.

3. The voltage regulator circuit as defined in claim 2 wherein the control means further comprises:

feedback switching means, interconnected between the second switching transistor and Zener diode and responsive to a transition in control signal levels, for feeding back a signal from the second transistor to the Zener diode to stabilize the transition in states of the Zener diode.

4. The voltage regulator circuit as defined in claim 2 wherein the electrical storage device, field winding, and second switching transistor all form part of a common current path, and the control means further includes:

a first diode connected in parallel relation with the second switching transistor, and oriented to protect the second transistor against operation in the reverse mode caused by transitions in battery voltage, and a second diode connected in parallel relation with the field winding and in serial relation with the first diode, and oriented to provide a discharge path for reactive voltages caused by transitions in energization of the field winding.

* * * * *